Feb. 6, 1962 R. B. BEARD ETAL 3,019,647
ELECTRICAL FLUID-FLOW MEASURING APPARATUS
Filed Aug. 30, 1957 4 Sheets-Sheet 3

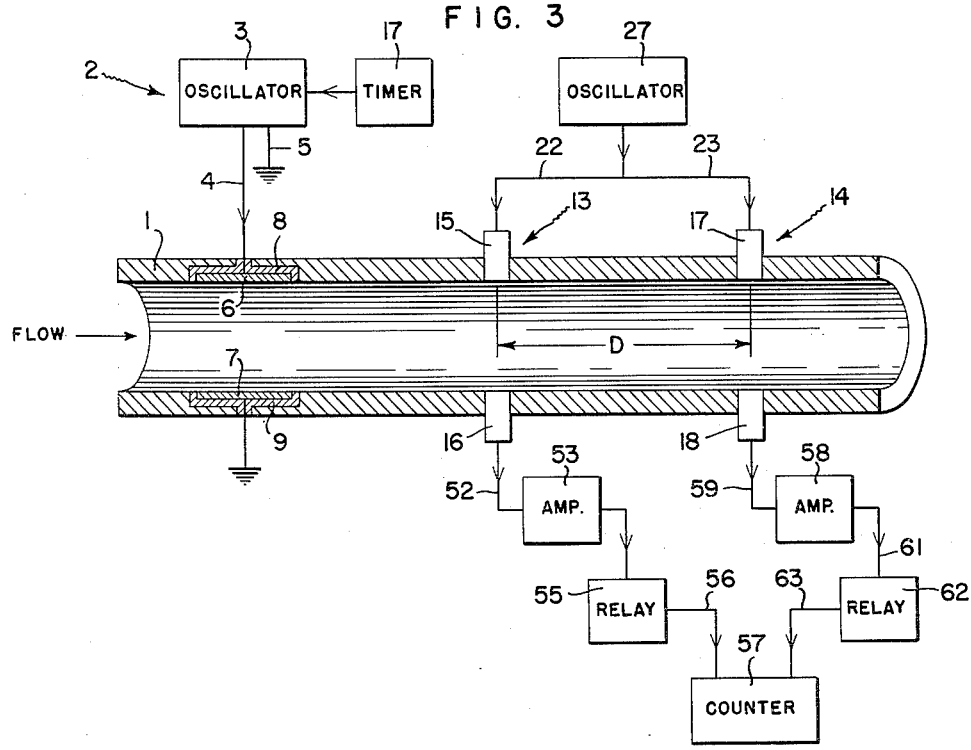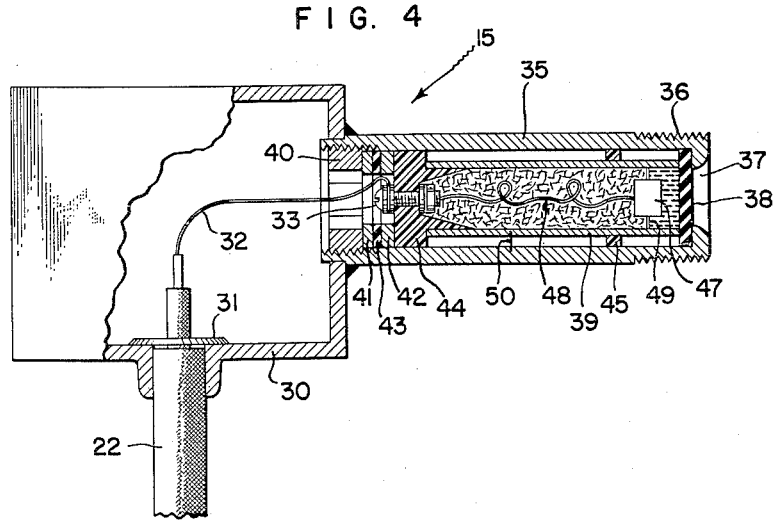

INVENTORS.
RICHARD B. BEARD
BY KENNETH C. HUDSON

ATTORNEY.

Feb. 6, 1962    R. B. BEARD ETAL    3,019,647
ELECTRICAL FLUID-FLOW MEASURING APPARATUS
Filed Aug. 30, 1957    4 Sheets-Sheet 4

INVENTORS.
RICHARD B. BEARD
BY KENNETH C. HUDSON

ATTORNEY.

United States Patent Office 3,019,647
Patented Feb. 6, 1962

3,019,647
ELECTRICAL FLUID-FLOW MEASURING
APPARATUS
Richard B. Beard and Kenneth C. Hudson, Philadelphia, Pa., assignors to Minneapolis-Honeywell Regulator Company, Minneapolis, Minn., a corporation of Delaware
Filed Aug. 30, 1957, Ser. No. 681,384
3 Claims. (Cl. 73—204)

The present invention generally pertains to flow measuring apparatus. More specifically, the present invention pertains to that class of flow measuring apparatus in which the rate of flow of a fluid in a conduit is measured by detecting the time required for a heated slug of the fluid to travel a predetermined distance in the conduit.

A general object of the present invention is to provide a new and improved flow meter which is adapted to accurately measure the flow of a fluid in a conduit without interfering with that flow.

In accordance with the present invention, slugs of a flowing liquid are marked in the sense of having their temperature raised by a heating means which is turned on and off intermittently. The velocity of a fluid flowing in a conduit is measured by measuring the time required for such a heated slug of fluid to travel a predetermined distance. Accordingly, it is a specific object of the present invention to provide a new and improved means for detecting the passage of heated slugs of fluid through a conduit.

Another specific object of the present invention is to utilize ultrasonic means to accurately detect and initiate the timing of the passage of heated slugs of fluid through a conduit.

Still another object of the present invention is to utilize, in a flow measuring apparatus, the change in the ultrasonic wave absorption properties of a fluid with temperature to detect the passage of heated slugs of fluid through a conduit.

A further object of the present invention is to utilize, in a flow measuring apparatus, the variation with temperature of the velocity of an ultrasonic wave in a fluid to detect the passage of heated slugs of a fluid through a conduit.

A better understanding of the present invention may be had from the following description read with reference to the accompanying drawings, of which:

FIG. 3 is a diagram of a preferred embodiment of the present invention in which the passage of heated slugs of fluid through a conduit is detected by means responsive to the variation with temperature of the ultrasonic wave absorption properties of the fluid;

FIG. 4 is an illustration showing one form that the ultrasonic wave transmitting and receiving transducers utilized in the apparatus shown in FIG. 3 may assume;

Figure 6:
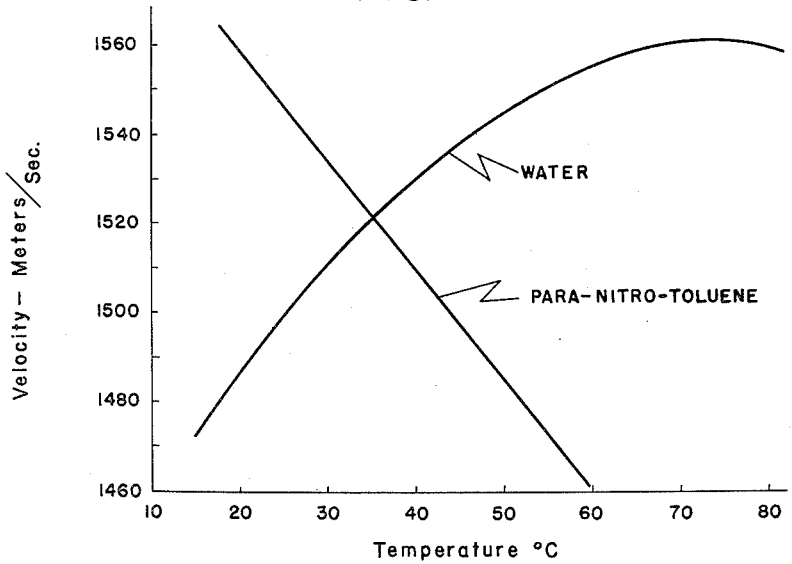
Figure 7:
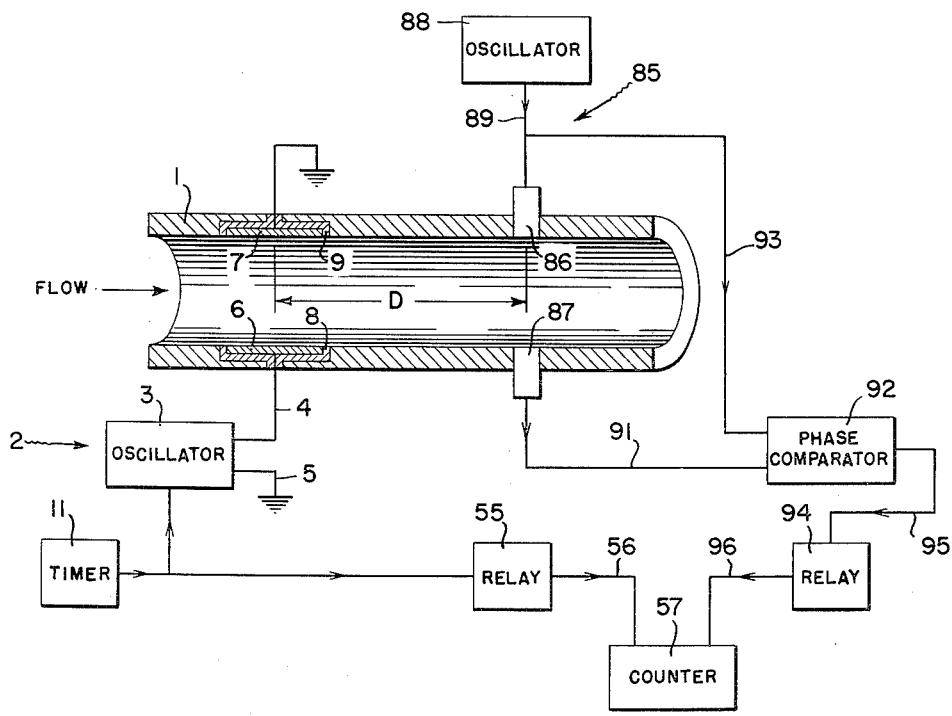

FIG. 6 is a curve showing the variation with temperature in the velocity of an acoustical wave in water and another liquid, para-nitro-toluene; and FIG. 7 is a diagram of another preferred embodiment of the present invention in which the passage of heated slugs of fluid through a conduit is detected by means responsive to the variation with temperature in the velocity of an ultrasonic wave transmitted through the fluid.

Figure 1:
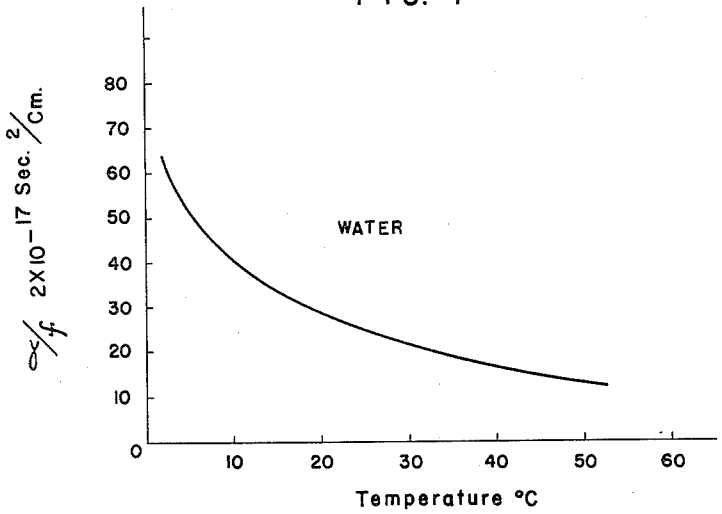
FIG. 1 is a curve showing the variation with temperature in the ultrasonic wave absorption properties of water.
Figure 2:
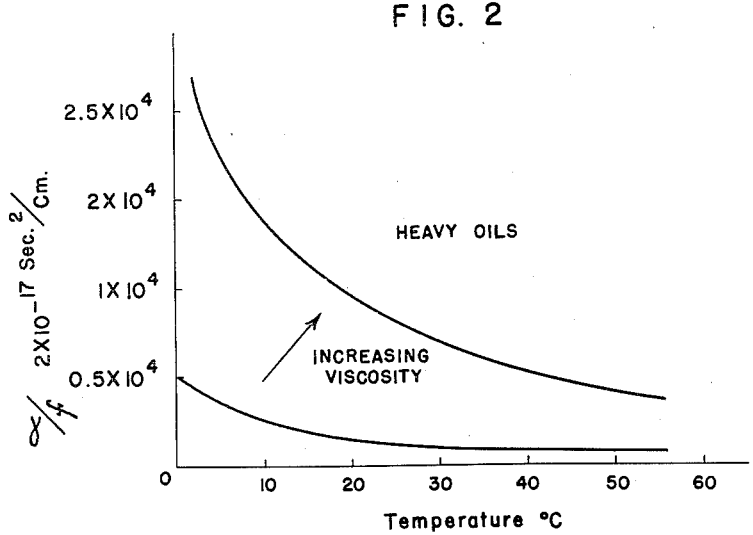
FIG. 2 is a curve showing the variation with temperature in the ultrasonic wave absorption properties of heavy oils.

In fluids, the absorption of an ultrasonic wave varies exponentially as the reciprocal of a temperature. FIGS. 1 and 2 show the temperature absorption curves for water and heavy oils respectively. It should be observed that at temperatures around normal room temperature the absorption variation with temperature of an ultrasonic wave is quite large. Thus, if ultrasonic waves are transmitted through a fluid flowing in a conduit at room temperature and a slug of this fluid is raised even a few degrees above room temperature, there will result a considerable change in the absorption coefficient. The same effect could also be achieved by cooling the fluid below room temperature. Accordingly, slugs of hot or cold fluid flowing through a conduit and passing by a pair of electro-mechanical transducers, one of which is a transmitting transducer, and the other a receiving transducer, would increase or decrease the attenuation of acoustical signals being transmitted between these two transducers. The intensity of the sound transmitted between the two transducers varies according to the following relationship.

$$I = I_0 e^{-\alpha x}$$

where:
$\alpha$ = the absorption coefficient of the fluid
$I_0$ = the intensity of the wave at the transmitter
$I$ = the intensity at a distance $x$ from the transmitting transducer From this equation it can be seen that a small variation in the absorption coefficient will give a considerable variation in the intensity of the transmitted sound.

Referring now to FIG. 3, there is shown a diagram of a flow meter utilizing the principle just described. The numeral 1 designates a pipe or conduit through which is flowing a fluid having acoustical wave transmission properties which vary with temperature. The numeral 2 designates a dielectric heating means for periodically heating slugs of fluid flowing through the conduit 1. As shown, the output of an oscillator 3 is applied by means of the connections 4 and 5 to a pair of metallic plates 6 and 7 mounted in the conduit 1. The metallic plates 6 and 7 are electrically insulated from the conduit 1 by means of the electrical insulations 8 and 9. The output of the oscillator 3 is of a suitable frequency to dielectrically heat the fluid flowing past the plates 6 and 7. A timer 11 periodically turns the oscillator 3 on and off thereby causing the dielectric heating means 2 to heat slugs of the fluid passing through the conduit 1. It should be noted that the dielectric heating means 2 does not interfere with the flow of the fluid in the conduit 1. The use of an inductive heating means would also not interfere with the flow of the fluid in the conduit 1.

As the heated slugs of fluid flow through the conduit 1, they pass a first pair of electromechanical transducers 13, then a second pair of electromechanical transducers 14 a predetermined distance, D, downstream from the transducers 13. The time required for a heated slug of fluid to travel the distance, D, between the two pairs of transducers is inversely proportional to the rate of flow of the fluid in the conduit 1. The pair of electromechanical transducers 13 comprises the transmitting transducer 15 positioned on one side of the conduit 1 and a receiving transducer 16 positioned on the opposite side of the conduit 1 from the transmitting transducer 15. Similarly, the pair of electromechanical transducers 14 comprises a transmitting transducer 17 positioned on one side of the conduit 1 and a receiving transducer 18 positioned on the opposite side of the conduit 1 from the transducer 17. The transmitting transducers 15 and 17 are connected to the output of an oscillator 27 by means of the conductors 22 and 23 respectively. Both of the transmitting transducers 15 and 17 are capable of converting the electrical output of the oscillator 27 into mechanical wave energy signals for transmission through the fluid in the conduit 1. Both of the receiving transducers 16 and 18 are capable of converting the mechanical wave energy transmitted from the transmitters 15 and 17 respectively into an electrical signal output.

Referring for a moment to FIG. 4, there is shown one form of electromechanical transducer which may be employed in the present apparatus. The transmitting and receiving transducers may be substantially the same and thus, only a detailed description of the transmitting transducer 15 will be given. As shown, the conductor 22 is physically attached to a housing 30 with the shielding 31 of the conductor 22 electrically connected to the housing 30. A center conductor 32 of the conductor 22 is arranged for connection to an electrical terminal 33. Supporting the housing 30 is a cylindrical member 35 which is threaded at 36 so as to be readily engageable with the the conduit 1. The outer end of the member 35 has an opening 37 which is sealed by a silicone rubber diaphragm 38. The diaphragm 38 is held in position by a further cylindrical member 39 which is forced into engagement with the diahpragm by a threaded member 40 which engages threading on the inner surface of the cylinder 35. The threaded member 40 acts through a pair of washers 41 and 42 and a sealing rubber washer 43 with the washer 42 bearing against a polystyrene bushing 44. The bushing 44 serves as a mounting point for an electrical terminal 33. The cylindrical member 39 is maintained in position at its outer end by means of a cylindrical plastic spacer 45 which may be in peripheral engagement with the outer surface of the cylinder 39.

Mounted within the cylinder 39 is an electromechanical transducer element 47. This transducer element may take the form of any well known transducer presently commercially available. A transducer material which is presently very widely used is barium titanate which is capable of producing large mechanical vibrations with relatively small electrical signals. Such a transducer is disclosed in the Gray Patent 2,486,560, issued November 1, 1949. Electrical contact is made with the transducer by means of a connecting wire 48 and a further connecting wire 49 which connects to the housing 30 by way of the cylinder 39, connector 50, and the cylinder 35. The space in back of the transducer elements 47 is filled with a mixture of castor oil and rockwool which has the effect of damping out the mechanical vibrations which move in the reverse direction from the transducer 47. The space in front of the transducer 47 is filled with castor oil alone which serves to mechanically couple the transducer vibrations through the diaphragm 38 to the space adjacent to the outer edge of the diaphragm 38. The electrical signals received from the conductor 22 are applied to the transducer 47 and the transducer will produce mechanical vibrations which will follow the electrical signals on the input. These vibrations are transmitted through the diaphragm 38 to the fluid flowing in the conduit 1 which is in contact therewith.

When the apparatus of FIG. 4 is used as a receiver, the mechanical vibrations are transmitted in through the opening 37, through the diaphragm 38, to the transducer 47 where the mechanical vibrations are converted to electrical signals. The electrical signals are then transmitted through the cabling to the appropriate electrical circuit.

The electrical output signal produced by the receiving transducer 16 is applied to the input of an amplifier 53 by means of the conductor 52. The amplifier 53 is operative to amplify that signal and apply it to operate a relay 55. The relay 55, in turn, is operative, through the conductor 56, to control the energization of a counter 57. The counter shown in Barrett Patent 2,353,382 may be suitable for the present purpose. Similarly, the output of the receiving transducer 18 is connected to the input of an amplifier 58 by means of a conductor 59. The amplifier 58 is operative to amplify that output and apply it, by means of a conductor 61 to operate a relay 62. The relay 62 is also operative to control the energization of the counter 57 by means of the connection 63.

It should be noted from the curves in FIGS. 1 and 2 that as the temperature of a fluid increases, its ability to attenuate an ultrasonic wave will also increase. Thus, as a heated slug of fluid flows past the transmitting transducer 15, the amount of electromechanical energy transmitted from the transducer 15 through the fluid to the receiving transducer 16 will be greatly reduced. Hence, the electrical output of the transducer 16 which is applied to the input of the amplifier 53 will also be reduced. As a result, the output of the amplifier 53 will cause the relay 54 to be deenergized turning on the counter 57. As the heated slug of fluid passes between the transducers 17 and 18, the mechanical energy transmitted between the transducers 17 and 18 will also be reduced, lowering the electrical output of the transducer 18. As the electrical output of the transducer 18 is lowered, the relay 62 will be deenergized, turning off the counter 63. The time required for the heated slug of fluid to pass between the two pairs of electromechanical transducers 13 and 14 is given by the following equation:

$$t_{off} - T_{on} = \frac{D}{v_t} = KR$$

$$v_t = \frac{D}{KR}$$

where:

$R$ = reading on the counter
$K$ = scale factor
$D$ = distance between the transmitters Since all of the fluid in the conduit 1 is flowing at the same rate, it can be seen that the reading on the counter 57 is inversely proportional to the volumetric flow of the fluid through the conduit 1.

Figure 5:
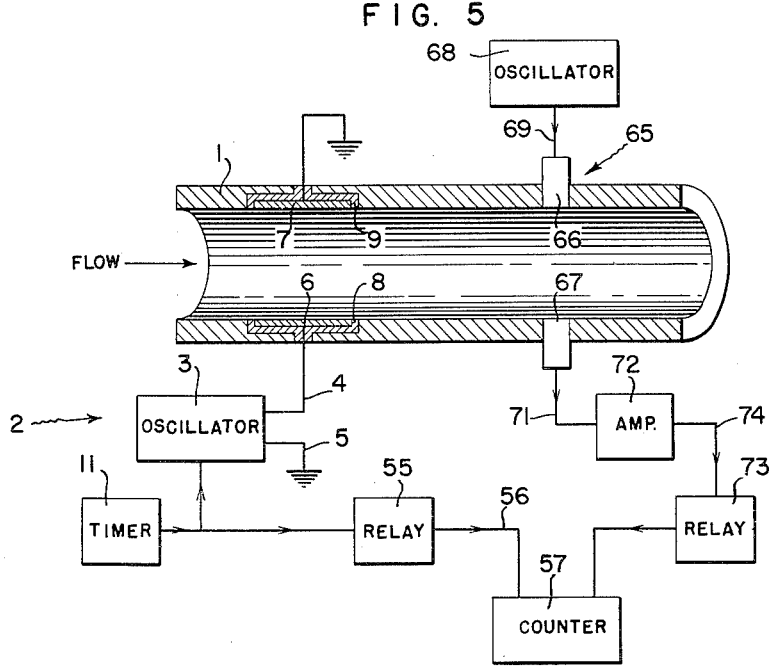
FIG. 5 is a diagram showing a modification of the embodiment of the present invention shown in FIG. 3.

Referring now to FIG. 5, there is shown a modification of the flow meter shown in FIG. 3 which employs only one set of electromechanical transducers. Similar reference characters have been employed to designate components similar to those shown in FIG. 3. Since the operation of those components in the embodiments of the present invention shown in both figures is identical, the description of their operation will not be repeated. As shown, this embodiment of the present invention utilizes a single pair of electromechanical transducers 65. The timer 11 which turns on and off the oscillator 3 of the dielectric heating means 2 is employed to control the operation of a relay 55 which, in turn, controls the operation of the counter 57. The electromechanical transducers 65 are located a predetermined distance D downstream from the dielectric heating means 2 and are employed to turn off the counter 57 upon the passage of a heated slug of fluid. The electromechanical transducers 65 include a transmitting transducer 66 and a receiving transducer 67 mounted on the opposite side of the conduit 1 from the transmitting transducer 66. The transmitting transducer 66 is energized from an oscillator 68 by means of the conductor 69. As shown, the output of the receiving transducer 67 is connected by means of a conductor 71 to an amplifier 72 which is operative to control the relay 73 through the connection 74.

In operation, the timer 11 is operative to energize the relay 55, turning on the counter 57 when the oscillator 3 is energized to heat a slug of fluid in the conduit 1. As this slug of fluid flows between the transmitting and receiving transducers 66 and 67, the signal transmitted between them is attenuated, causing the electrical output of the receiving transducer 67 to be reduced, deenergizing the relay 73 which, in turn, turns the counter 57 off. As previously explained, the count accumulated in this interval by the counter 57 is inversely proportional to the rate of flow of the fluid in the conduit 1.

The velocity of an ultrasonic wave in a fluid varies as a quadratic function of the temperature. FIG. 6 is a curve showing the variation with temperature in the velocity of an ultrasonic wave in water and also in paranitro-toluene. Since the velocity of an ultrasonic wave in fluid does vary considerably with temperature, this phenomena can also be utilized to detect the passing of a heated slug of fluid past a pair of electromechanical transducing means. It should be noted, however, that when the rate of flow of water is being measured that an ambiguity occurs at approximately 75° C. Accordingly, a flow meter detecting the change with temperature in the velocity of a sound wave in water would have to operate in a temperature range below 75° C. However, if the apparatus were operated at temperatures of between 20° C. and 60° C., an increase in temperature of 10° C. would give a considerable variation in the velocity of the wave without encountering any ambiguity. Thus, in actual operations, the variations in velocity of an acoustical wave due to a slug of heat flowing in a conduit is large enough to provide a sensitive flow measuring instrument.

Referring now to FIG. 7 there is shown an embodiment of the present invention in which the passage of heated slugs of fluid through a conduit is detected by means responsive to the variation with temperature in the velocity of an acoustical wave transmitted through the fluid. Again, similar reference characters have been employed to designate components similar to those shown in FIGS. 3 and 5. Since the operation of these components in this embodiment of the present invention is identical to their operation in the embodiments previously described, the description of their operation will not be repeated. As shown, this embodiment of the present invention utilizes a single pair of electromechanical transducers 85. The timer 11, which turns on and off the oscillator 3 of the dielectric heating means 2, is employed to control the operation of the relay 55 which, in turn, controls the operation of the counter 57. The electromechanical transducers 85 are located a predetermined distance D downstream from the dielectric heating means 2 and are employed to turn off the counter 57 as a slug of heated fluid passes thereby. The electromechanical transducers 85 comprise the transmitting transducer 86 and a receiving transducer 87 mounted on the opposite side of the conduit 1 from the transmitting transducer 86. The transmitting transducer 86 is energized from an oscillator 88 by means of a conductor 89. As shown, the output of the receiving transducer 87 is connected by means of conductor 91 to a phase comparator 92. The output of the oscillator 88 is also fed directly to the phase comparator 92 by means of a conductor 93. The phase comparator 92 is connected to a relay 94 by means of the connection 95 and is adapted to control the operation of the relay 94, the phase relationship between the output of the oscillator 88, and the electrical output of the transducer 87 reaches a predetermined value. The relay 94, in turn, is operative to turn off the counter 57 by means of the connection 96.

In operation, as a slug of heat is placed into the fluid upstream from the electromechanical transducers 85, the relay 55 is energized turning on the counter 57. As the slug of heat flows between the transducers 86 and 87, the velocity of the ultrasonic wave transmitted between the two transducers is changed. This changes the phase of the electrical output of the receiving transducer 87 with respect to the phase of the output of the oscillator 88. As shown, the output of the oscillator 88 is also fed into the phase comparator 92 which is operative to compare the phase of the output of the transducer 87 with the output of the oscillator 88 and deenergize the relay 94 when a predetermined difference in the phase between the two signals occurs. Thus, a change in the phase of the ultrasonic wave transmitted between the transducers 86 and 87, caused by the passing of a heated slug of fluid between the two transducers, is sufficient to cause the phase comparator 92 to deenergize the relay 94, turning off the counter 57. As previously explained, the count accumulated by the counter 57 during the interval in which it is energized is inversely proportional to the rate of flow of the fluid in the conduit 1.

Thus, the present invention provides a flow meter which is adapted to measure the flow of a fluid in a conduit without interrupting flow of that fluid. If dielectric heating means or induction heating means are employed with the plates embedded in the wall of the conduit, the heating means will not project into the conduit to in any way disturb the flow of the fluid therethrough. Similarly, unlike prior art flow meters which utilize such means as thermocouples or resistance grids projected into the fluid flow stream to detect the passage of heated slugs of fluid, the present invention utilizes ultrasonic transducers which can be mounted flush with the wall of the conduit and thus will not project into the flow stream. Furthermore, the utilization of ultrasonic means to detect the passage of heated slugs of fluid provides an instantaneous means of detection as opposed to other means which have inherent thermal capacities and thus time lags.

It will be apparent to those skilled in the art that, even though there is an ambient temperature variation of the fluid temperature, the system can be adjusted to be insensitive to such variations.

Having now described the invention, that which it is desired to secure by Letters Patent is:

1. Apparatus for measuring fluid flow comprising a conduit for said fluid, high frequency dielectric heating means associated with said conduit for rapidly heating small volumes of said flowing fluid, an ultrasonic wave transmitting device positioned along said conduit a predetermined distance down-stream from said heating means for transmitting ultrasonic signals into said flowing fluid, ultrasonic wave receiving means positioned along said conduit diametrically opposite said transmitting device to receive said ultrasonic signals from said transmitting device, said fluid constituting an acoustic coupling medium between said transmitting device and said receiving means, the coupling characteristic of said medium being altered by said heating thereof, means responsive to the change in the characteristic of coupling between said transmitting device and said receiving device to produce a control signal, and means responsive to the energization of said heating means to initiate a count and to said control signal to terminate said count for timing the passage of said heated volume of fluid between said heating means and said ultrasonic devices for indicating the rate of flow of said fluid.

2. Apparatus for measuring fluid flow comprising a conduit for said fluid, high frequency dielectric heating means associated with said conduit for periodically rapidly heating small volumes of said flowing fluid, an ultrasonic wave transmitting device positioned along said conduit a predetermined distance downstream from said heating means for transmitting ultrasonic signals into said flowing fluid, ultrasonic wave receiving means positioned along said conduit diametrically opposite said transmitting device to receive said ultrasonic signals from said transmitting device, said fluid constituting an acoustic coupling medium between said transmitting device and said receiving means, the coupling characteristic of said medium being altered by said heating thereof, means responsive to the change in the characteristic of coupling between said transmitting device and said receiving device to produce a control signal, and means responsive to the energization of said heating means to initiate a count and to said control signal to terminate said count for timing the passage of said heated volume of fluid between said heating means and said ultrasonic devices for indicating the rate of flow of said fluid.

3. Apparatus for measuring fluid flow comprising a conduit for said fluid, high frequency dielectric heating means associated with said conduit for periodically rapidly heating small volumes of said flowing fluid, a first ultrasonic wave transmitting device positioned along said conduit downstream from said heating device for transmitting ultrasonic signals into said flowing fluid, a first ultrasonic wave receiving device positioned along said conduit diametrically opposite said first transmitting device to receive said ultrasonic signals from said first transmitting device, a second ultrasonic wave transmitting device positioned along said conduit a predetermined distance subsequent to said first such device in the direction of flow of said fluid for transmitting a second set of ultrasonic signals into said fluid, a second ultrasonic wave receiving device positioned along said conduit diametrically opposite said second transmitting device to receive said ultrasonic signals from said second transmitting device, said fluid constituting an acoustic coupling medium between said transmitting devices and their corresponding receiving devices, the coupling characteristic of said medium being altered by said heating thereof, means responsive to the change in the characteristic of coupling between said first transmitting device and said first receiving device occasioned by the passage of a heated volume of fluid thereby to produce a first control signal, and means responsive to the change in the characteristic of coupling between said second transmitting device and said second receiving device occasioned by the passage of the heated volume of fluid thereby to produce a second control signal, and means responsive to said first control signal for initiating a count and to said second control signal for terminating said count for timing the passage of said heated volumes of fluid between said first ultrasonic devices and said second ultrasonic devices for indicating the rate of flow of said fluid.

References Cited in the file of this patent

UNITED STATES PATENTS

| | | |
|---|---|---|
| 2,353,382 | Barrett | July 11, 1944 |
| 2,508,365 | Bierwirth | May 23, 1950 |
| 2,536,082 | Perkins | June 2, 1951 |
| 2,569,974 | Campbell | Oct. 2, 1951 |
| 2,573,390 | Blanchard | Oct. 30, 1951 |
| 2,724,271 | Shawhan et al. | Nov. 22, 1955 |
| 2,776,565 | Hudson | Jan. 8, 1957 |
| 2,794,974 | Bagno et al. | June 4, 1957 |

FOREIGN PATENTS

| | | |
|---|---|---|
| 598,176 | Great Britain | Feb. 12, 1948 |
| 601,298 | Great Britain | May 3, 1948 |